July 21, 1964     C. A. BEHRENS     3,141,692
BOLT LATCH
Filed Jan. 22, 1962
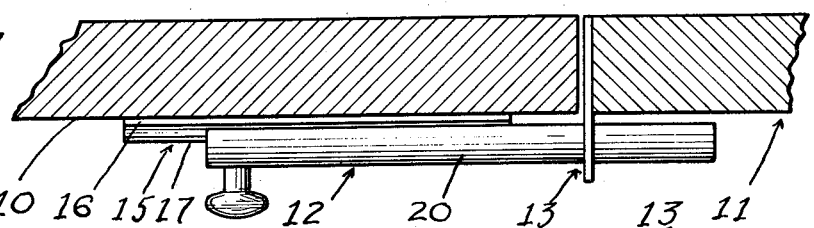
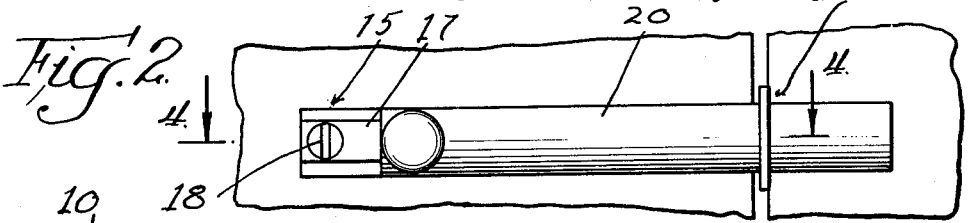
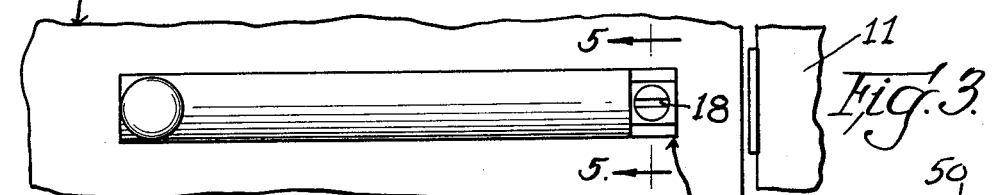
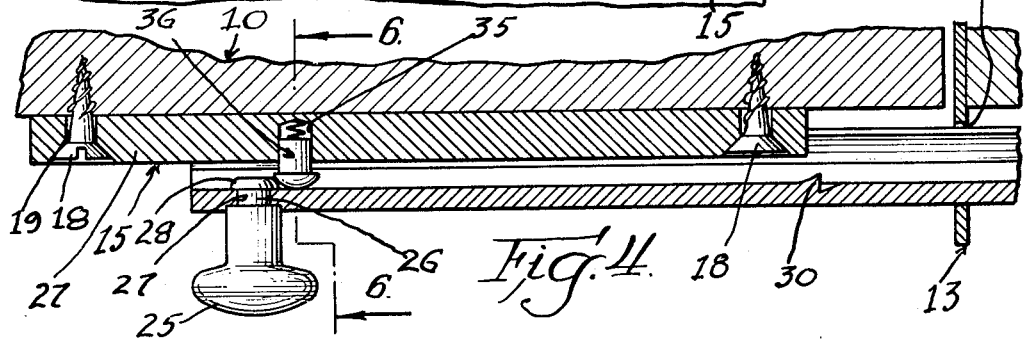
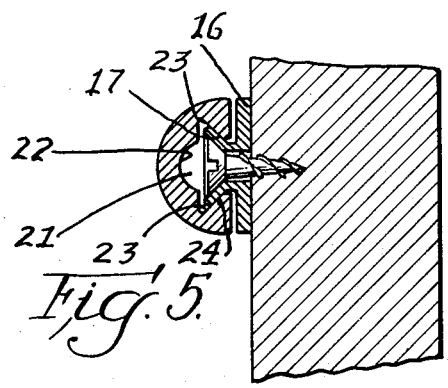
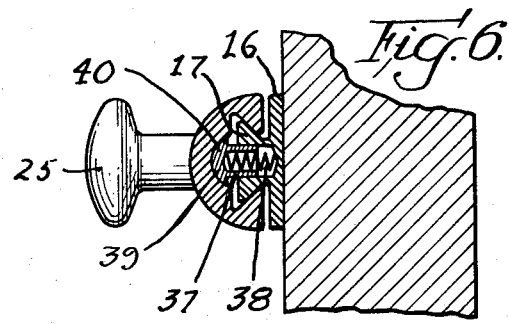
INVENTOR.
Charles A. Behrens
BY
Fidler, Beardsley & Bradley
Att'ys.

United States Patent Office 3,141,692
Patented July 21, 1964

3,141,692
BOLT LATCH
Charles A. Behrens, Sterling, Ill., assignor to National Manufacturing Co., Sterling, Ill., a corporation of Illinois
Filed Jan. 22, 1962, Ser. No. 167,495
4 Claims. (Cl. 292—147)

This invention relates to bolt latches and has to do more particularly with a bolt latch of the type known as a "surface bolt" having novel means for frictionally retaining the bolt in any position to which it is moved.

Surface bolts, as is well known, are used for locking doors, such as French, twin, or Dutch doors and windows such as casement windows. Such a bolt often includes a base or track which is secured to one of the members to be secured, and a bolt slidable on the base or track into and out of engagement with a keeper on the other member for securing the members in closed position relative to each other. Means are often provided for frictionally holding the bolt in any position to which it is moved. Thus the bolt may be held either in open or closed position by such frictional means.

Various attempts have been made to provide a satisfactory frictional means, including a leaf spring carried by the track and engageable with the bolt, and a wire spring carried by the bolt and engageable with the base. However, none of the prior attempts to provide frictional means for retaining the bolt in position have been entirely satisfactory. Where a wire spring or a leaf spring has been used, such expedient has been subject to the disadvantage that the spring may jam during operation. Moreover, such expedient has involved considerable expense in forming the base or bolt to carry the spring.

In accordance with the present invention, a surface bolt is provided which is of extremely simple construction, and yet has an effective, resilient means for yieldably providing friction between the bolt and the base. Such means includes a plunger which is received in a seat or socket in the base and is yieldably urged as by a spring into frictional engagement with the opposing portion of the bolt, thereby providing sufficient resistance to movement to maintain the bolt in any position to which it is moved. The plunger and spring are so formed that there is no likelihood of jamming or binding but the bolt is permitted to move smoothly between its various positions and is firmly maintained in any position by the frictional means.

An object of the invention is to provide a new and improved surface bolt.

Another object is to provide a surface bolt having novel means for retaining it in any position to which it is moved.

Still another object is to provide a surface bolt of such construction that it can be readily and inexpensively made with a minimum number of members and a minimum of manufacturing operations.

Another object is to provide a surface bolt which can be formed from two members of extruded stock, a knob, a plunger, and a spring and which members can be prepared for asembly and assembled with only a few simple, inexpensive machine operations, namely, drilling, countersinking, and upsetting operations.

Other objects and advantages of the invention will appear from the following description taken in connection with the appended drawings wherein:

FIG. 1 is a top view of the surface bolt with the bolt member in locked position;

FIG. 2 is a front, elevational view of the surface bolt with the bolt member in locked position;

FIIG. 3 is a front, elevational view with the bolt member in open position;

FIG. 4 is an enlarged sectional view taken along line 4—4 of FIG. 2;

FIG. 5 is a partial sectional view taken along line 5—5 of FIG. 3; and

FIG. 6 is a partial, sectional view taken along line 6—6 of FIG. 4.

Referring now particularly to the drawings, the bolt latch of the present invention is shown in connection with a pair of swingably mounted, relatively movable members 10 and 11 which may, for example, be French, twin, or Dutch doors, or casement window members. The first portion of the latch, or bolt assembly 12, is secured to the member 10 in a manner hereinafter described and the second portion or keeper 13 is secured to the other member 11 as by screws (not shown).

The bolt assembly 12 includes a base member or track 15 formed with a flat body portion 16 and an upstanding rail portion 17 of "dovetail" form. The rail 17 extends the full length of the body portion 16, as wil be seen from FIGS. 2 to 4. The base member or track 15 is secured to the first door or window member 10 by two screws 18 extending through counter-sunk holes 19 in the base member or track 15 and into the member 10.

The outer end (right hand end as viewed in FIGS. 1 to 4) of the base member 15 is spaced inwardly from the adjacent edge of the member 10 a short distance for a purpose which will hereinafter appear.

The bolt assembly 12 includes a bolt member 20 formed as an elongate channel member preferably of semi-circular outer cross section, such member defining a channel 21 formed with an inner surface provided with an arcuate groove 22 and side acute angular side grooves 23. The walls of the channel 21 at the side grooves 23 converge inwardly at a suitable distance apart and at such angles as to correspond to the inclination and spacing of the side edges 24 of the dovetail shape rail portion 17. Thus, when the bolt member 20 is assembled over the base member 15, the channel 21 on the interior of the bolt member 20 receives the dovetailed portion 17 and guides the bolt member 20 for longitudinal sliding movements in either direction on the base member 15.

A knob 25 has a shank 26 extending through a hole 27 in the wall of the bolt member and a rivet head 28 formed as by upsetting the metal of the shank to secure the knob firmly on the bolt member 20. The rivet head 28 serves as a stop, as hereinafter explained.

The material of the bolt member 20 on the inner side of the member is upset to provide a stop 30 which is spaced from the stop 28 in the direction of the other end of the bolt member for a purpose which will hereinafter appear.

Intermediate its ends and nearer to its inner end (left hand end as viewed in FIGS. 1 to 4), the base member 15 is provided with a socket 35 in its outer surface and opening toward the bolt member 20. Slidably disposed in the socket 35 is a plunger 36 having a hollow shank portion 37 by which the plunger 36 is guided in the socket 35. A coil spring 38 is disposed in the socket and in the hollow shank portion 37 and urges the plunger 36 toward the bolt member 20. The plunger is formed with an enlarged, circular, solid head 39 which is larger than the socket 35 and limits the movement of the plunger inwardly in the socket 35. The head 39 has a convex outer surface 40, the curvature of which preferably is the same as the curvature of the groove 22 so that the surfaces of the head and the groove are in contact over a substantial area.

The plunger 36 is located at such a position that when the bolt member 20 is assembled on the base member 15, the plunger is disposed between the stops 28 and 30 and thus limits the movement of the bolt member 20 between a position as shown in FIGS. 1, 3 and 4 wherein the stop 38 is against the plunger 36, and a position as shown in FIG. 3 wherein the stop 30 is against the plunger.

The keeper 13, which may be of conventional construction, and, as shown, is formed as a flat plate, is provided with an opening 50 therethrough of a shape to receive the bolt member 20 therethrough. In the present illustrative embodiment, the opening 50 is of semi-circular shape corresponding to the shape of the bolt member 20 and of a slightly larger size.

It will now be seen that when the bolt member 20 is in its retracted position (as seen in FIG. 3), it is entirely disengaged from the keeper 13. On the other hand, the dimensions of the parts are such and the base member 15 is secured to the member 10 at such location that when the bolt member 20 is moved outwardly (to the right as viewed in FIGS. 1, 2 and 4), it passes into the opening 50 and engages with the keeper 13 to lock the members 10 and 11 in closed position.

The plunger 36 is constantly urged into engagement with the bolt member 20 and, thus retains it in any position to which the latter is moved. Accordingly, when the bolt member is in a position disengaged from the keeper, there is no danger that it will be unintentionally moved into position to engage the keeper and thus cause damage if the door or window member is moved to closed position before retracting the bolt member. On the other hand, the bolt member is securely held in locking position when moved thereto.

It will be seen from the foregoing that the bolt latch of the present invention is of very simple construction and lends itself readily to manufacture from a relatively small number of parts and with a relatively small number of machine operations. The base member may be formed from extruded stock of the desired cross section by merely cutting such member from stock and drilling the two screw holes 19 and the socket 35. The bolt member 20 may be also made from extruded stock and can be completed by merely cutting the stock to the proper length and drilling the knob hole 27 and upsetting the material of the member to form the stop 30.

In assembling the bolt latch, the spring 38 and plunger 36 are assembled with the base member 15 and the body of the bolt member 20, before the knob 25 is attached, is assembled on the base member 15 whereafter the body is moved to the position shown in FIG. 3 and the knob is attached by rivetting. It will be noted that the dimensions are such as to permit this mode of assembly.

The bolt assembly including the bolt member, base member, plunger and spring can be readily applied to the door or window member. The bolt member is first moved to one limit of its movement and one of the screws 18 is inserted through the corresponding screw hole 19 and screwed into the door or window member whereafter the bolt member is moved to the opposite end of its movement and the other screw is inserted.

The head of the plunger is made with the same curvature as the groove 22 and, thus, there is a maximum of surface area of the plunger in contact with the bolt member 20, thereby providing good frictional resistance to movement. However, the large area in contact and the curved shape of the plunger head insures that there will be no binding of the members as the bolt member is moved relatively to the base member. Moreover, the rounded surface on the stops 28 and 30 prevents any scratching or binding between the plunger and such stops. There are no critical dimensions in the device of the present invention and, therefore, it is not necessary to observe any close tolerances in manufacture. For example, the plunger being guided in the socket by its shank, good support for the plunger is provided and it is not likely to become canted to such an extent such as to bind even through there is substantial clearance between the stem and the socket. Moreover, the rounded shape of the head of the plunger and its cooperating groove in the bolt member permit rocking movement of the plunger without binding.

It will be seen that in accordance with the invention, the bolt latch can be formed from a minimum number of parts with a minimum number of machine operations and at a minimum expense. It will be noted particularly that only a single plunger is required and that no extra parts are required to form the stops for the bolt member, such stops being constituted by the knob 25 and by a portion of the bolt member 20.

While the bolt latch of the present invention has been described in connection with its use on French, twin, or Dutch doors or casement windows, it will be understood that it may be employed wherever it is desired to lock two relatively movable members together. Accordingly, one of the members may be a movable member such as a door or window and the other a fixed member such as a door jamb or a window frame.

While the clearance between the meeting edges of the members 10 and 11 has been shown as somewhat exaggerated, it will be understood that these edges may substantially or completely meet. In fact, the keeper may be mortised into the member which carries it as is common.

While the curvature of the groove 22 has been shown and described as being the same as the curvature of the convex surface of the plunger, it may be found desirable in certain cases to provide the former with a slightly longer radius than the latter or to make the groove of such shape that there is a clearance between the convex surface and the groove at the sides of the groove. Thus, any possibility of binding in the event that the several parts are not carefully aligned is eliminated.

I claim:
1. A bolt latch comprising
   an elongated base having a longitudinally extending track on one side thereof,
   said base having a plurality of mounting holes extending in a transverse direction from said one side to the opposite side, said holes being countersunk on said one side of said base,
   an elongated bolt mounted on said base for sliding movement along said track over said mounting holes,
   said bolt having therein a rectilinear groove facing toward said base and extending parallel to said track,
   said bolt having near one end thereof an aperture opening into said groove,
   a knob assembly having a portion extending through said aperture and protruding a substantial distance into said groove,
   a stop extending from said bolt into said groove at a location spaced from said knob portion,
   and resilient means carried by said base and extending into said groove between said knob portion and said stop for limiting movement of said bolt along said track and for preventing spurious movement between said bolt and said base.

2. A bolt latch according to claim 1 wherein said plurality of mounting holes comprises two holes respectively disposed near the opposite ends of said base,
   said knob is spaced from one end of said bolt by a distance less than the distance between one of said two holes and said means, and
   said stop is spaced from the other end of said bolt by a distance less than the distance between the other of said holes and said means,
   whereby said holes are respectively accessible when said bolt is in its two extreme positions.

3. A bolt latch according to claim 1 wherein said means comprises
   means defining a transverse recess in said base opening onto said groove,
   a plunger partially disposed in said recess and extending into said groove for limiting the movement between said bolt and said base,
   and a coil spring mounted in said recess behind said plunger for resiliently biasing said plunger against said bolt.

4. A bolt latch according to claim 3 wherein said track comprises an integrally formed upstanding rail of dovetail cross-sectional configuration, and said bolt further includes a longitudinally extending groove, complementary in cross section and receiving said rail, said mounting holes extending through said rail.

References Cited in the file of this patent

UNITED STATES PATENTS

| | | |
|---|---|---|
| 2,100,622 | Adams | Nov. 30, 1937 |

FOREIGN PATENTS

| | | |
|---|---|---|
| 22,853 | Great Britain | of 1897 |
| 551,103 | France | Dec. 26, 1922 |
| 681,170 | Great Britain | Oct. 22, 1952 |